Figure 1:
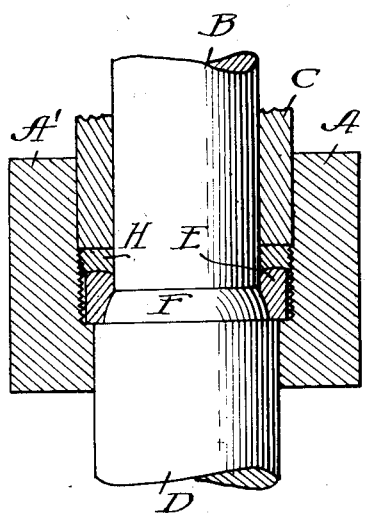

Feb. 19, 1929.

F. N. BARD 1,702,958

PROCESS OF MAKING GASKETS

Filed Dec. 12, 1921

Inventor:
Francis N. Bard
By Paul Carpenter atty.

Patented Feb. 19, 1929.

1,702,958

UNITED STATES PATENT OFFICE.

FRANCIS NORWOOD BARD, OF HIGHLAND PARK, ILLINOIS.

PROCESS OF MAKING GASKETS.

Application filed December 12, 1921. Serial No. 521,622.

Broadly considered, my present invention relates to the art of making composite structures, and more particularly to the procedure for producing structures formed, in part at least, of plastic material, and has special reference to the provision of an improved process for the manufacture of structures such as fluid pressure retaining gaskets, including a plurality of materials, wherein the wearing surface may be subject not only to pressure, friction and abrasion but also, at times, to high degrees of heat.

While my present invention has a wide range of usefulness, inasmuch as it finds a peculiar field of utility as an efficient process for the rapid manufacture of gaskets such as are characterized above, and more especially those wherein the wearing surface is firmly united to a backing which serves the functions of a reinforcement and a follower to press the gasket into contact with the member with reference to which it has relative movement, I will proceed to described the invention as it is utilized in connection with a continuous process such as is employed for the quantity production of gaskets for ball-and-socket pipe-joints like those shown in my patents numbered 1,346,523 and 1,346,524 wherein flexible joints such as those in which gaskets embodying my present improvements find one of their largest fields of utility, are commonly used as members in the connection of the air and steam pipe lines between railway train elements, as for example between the locomotive and tender or between cars.

Such flexible fluid connections must not only be fluid tight, in order to avoid wastage of material, but also in order to avoid interference with the operation of the train since, for example, a leak in the train pipe of the air-brake system if long enough continued would lead to uncalled for application of the brakes.

In practice I have found that metallic gaskets are unsatisfactory for a number of reasons, among which may be mentioned, difficulty in keeping them sufficiently tight to prevent leakage, a tendency to score or otherwise cut the metallic joint members (which renders them markedly unsuitable in cases such as ball-and-socket joints where the ball member has to be highly finished in order to maintain a tight joint,) an active corrosion when oxidizable metals are employed and an inherent tendency to stick or freeze when non-corrosive metals, such as bronzes and brasses, are employed in the manufacture of the joints.

On the other hand, such non-metallic gaskets as are known to me have proven unsatisfactory in service owing to the fact that if they are made of material soft enough to make a satisfactorily tight joint, there is a marked tendency towards distortion upon the application of pressure sufficient to keep the joint tight, this even to the extent of lateral spreading and bulging of the packing material, whereas if they are made of material sufficiently rigid to resist such tendency to distortion, not only are the packing qualities, as such, reduced, but the gaskets easily become chipped, broken or otherwise leaky and inefficient in service.

My present invention contemplates further the provision of an improved type of gasket construction which, while particularly useful in connection with fluid-tight ball-and-socket joints, has also a general field of utility in stuffing-boxes of various applications.

Stuffing boxes known to me are characterized in general by the employment of three elements, in combination with the casing and the member movable relatively thereto, viz: the packing material, the follower or gland bearing thereagainst, and the auxiliary means for forcing the follower against the packing in order to compress it and for holding the follower in predetermined position against movement relatively to the casing of the stuffing-box and thence the packing under compression.

In so far as known to me, no means has been provided for dispensing with such holding means, much less presenting the packing and follower in the form of a unitary structure.

My present invention presents additionally features of advantage in that the packing and follower may be formed integrally, and such integral structure and the stuffing-boxes may be arranged for co-operation in such a manner that the holding means can be dispensed with.

The primary objects of my invention, therefore, are the provision of an improved gasket structure which will present all of the advantages of the metallic types, the non-metallic types, and the composite types; the provision of an improved composite non-metallic gasket which will present such advantages; the provision of a combined gasket and follower; the provision of an improved gasket structure obviating the need of the employment of holding means for forcing a follower or gland into contact with the packing material; and generally to provide an improved form of packing or gasket structure capable of making and maintaining a tight and at the same time a durable joint; together with such other objects as may hereinafter appear.

In carrying out my improved process, I first provide a suitable backing which may be given any desired contour, and is preferably made of relatively harder and more rigid material, and desirably of material which is non-metallic and so unlikely to cut or abrade the parts, usually metallic, with which it is associated.

This non-metallic backing material may be red-fiber, vulcanite or bakelite, and should be of such a nature, and when expedient, of such a form that the wearing surface of the gasket may be brought not only into close but also into intimate contact with the backing, in order that it may interengage therewith and become firmly united thereto.

The wearing surface of the gasket may also be given any desired contour, and is preferably made of relatively softer and less rigid material, and desirably one which is more or less plastic, or at least self-accommodatory, not only for the sake of engagement with and unition to the backing, but also more particularly that it may conform to the contour of the parts, usually metallic as before suggested, with which it is in contact, in order to restrain the fluid from escaping or the pressure from becoming dissipated.

The gasket backings referred to may, if desired, be previously provided in quantity, or, preferably, the entire process of making the gaskets may be carried out on the spot, for a number of reasons including such factors as maintenance of predetermined conditions of temperature, certainty of supply and the like.

In the latter case, the backing may be formed in one mold, and the wearing surfaces formed thereupon, and united thereto in another, or each may be formed separately, and the two united together thereafter.

In my preferred practice, however, a suitable mold being provided, a backing of bakelite, which is a condensation product of phenol and formaldehyde, or of vulcanite, which is a mixture of rubber and sulphur, is produced in the mold.

There is then introduced into the mold and upon the backing thus produced a suitable portion of the material employed for forming the wearing surface, such as a mixture of asbestos, rubber and sulphur, which is given the desired contour by the molding operation, the material of the wearing surface being forced into intimate contact and interengagement with the backing and united firmly thereto by vulcanization, the steps being carried out under such conditions of heat and pressure as may be required but which, as they are known to those skilled in the art, need not be entered into here more extensively.

It will be understood that in forming the backing, I prefer to use such relatively harder non-metallic material as red-fiber vulcanite or bakelite, which on the one hand is free from any undesirable tendency to seize metallic surfaces, to flow, to chip, or to break down, under pressure, or to expand or contract upon change of temperature, and on the other hand may not only be molded to exact dimensions, including the formation of suitable threads but also are susceptible of forming a mechanically perfect joint with a suitable relatively softer non-metallic packing or gasketing substance such as the composition of rubber and asbestos or other suitable resistant fibrous material, which I preferably employ in forming the wearing surface of the gasket, (that part of the surface therebetween which contacts with the ball) and which, while it may not only be molded to precise dimensions and may be relied upon to conform closely to contour of the ball without either seizing the ball or permitting the passage of fluid around the ball and thence to the atmosphere, nevertheless has not the degree of mechanical strength desired in order that reliance may safely be placed upon the strength of the threads formed thereon in holding the gaskets in position.

A further desideratum is attained by the employment of the composite gasket structure just described in this that when the ball in service has worn the gasket down to a point where the backing of the gasket is exposed to contact with the ball, such backing being relatively softer than the ball (when such backing is made of such material as "bakelite" or "red-fiber") has no tendency towards abrasion of the ball.

For practicing the present process various forms of apparatus may be employed, but I find it convenient to employ the moulding devices shown in the accompanying drawings, where—

Figures 1 to 4 are central vertical sectional illustrations of mould assemblies utilized for carrying out the steps of producing my improved gaskets.

Referring first to the several figures, it will be observed that the mould assembly, as shown with the gasket in place, includes an outer shell A which limits the outermost peripheral contour of the gasket structure, a primary central plunger B which defines the innermost peripheral contour of the gasket structure, an intermediate sleeve C surrounding the plunger B and contained within the shell A, which determines the thickness of the gasket body and limits one end thereof, a secondary plunger D movable within the shell A and, in cooperation with the shell A limiting the opposite end of the gasket, and one or more auxiliary formers, E, F, interposed between the plungers B and D and serving in the present instance to impart a certain curved contour to a portion of the gasket structure. The backing of the gasket structure is indicated at H and the wearing element thereof at J.

As one of the principal objects sought to be accomplished by the present invention is the production of a gasket provided with a threaded outer periphery, I have illustrated a form of shell A adapted for such purpose by the provision of its inner periphery of a threaded portion K. The mold A is preferably centrally divided into homologous halves A, A', so as to permit the ready withdrawal of the threaded member produced therein.

Figure 2:
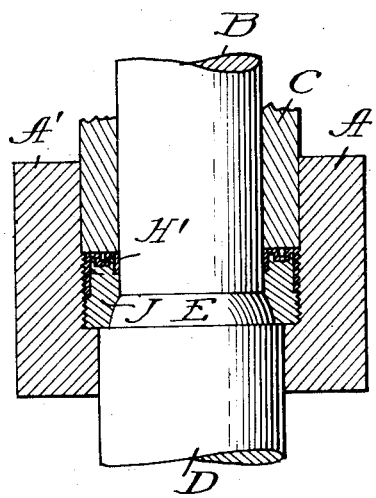
Figure 3:
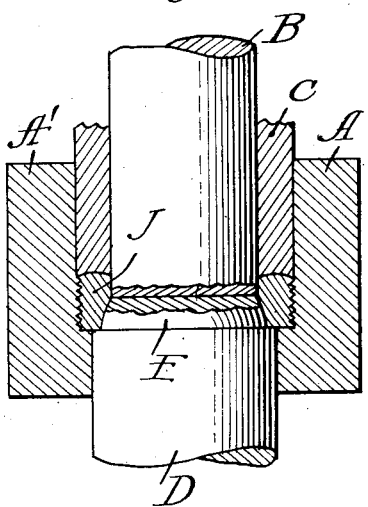
Figure 4:
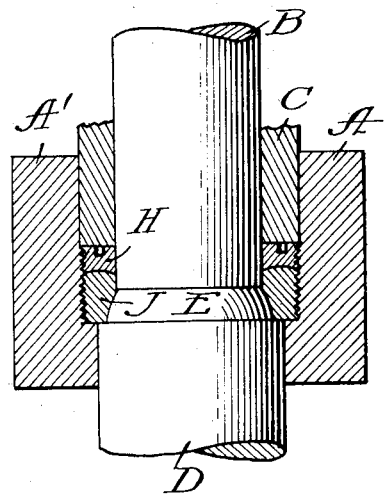

The gasket may be provided alternately in one of several ways now to be described; first, by taking a previously prepared backing member, of desired contour, such as is indicated at H in Figure 1 or, alternately at H' in Figure 2 and taking a previously prepared wearing member, such as is indicated at J in Figure 3, implacing them in the shell A, and so uniting them as by pressure, preferably in the presence of a suitable degree of heat as before explained, that they adhere and physical continuity therebetween is thus established; or second, by implacing one of the previously prepared members, H, J, in the shell A (Figure 4) and forming the other thereof thereupon and so uniting them as above suggested, or, third, a suitable composite mass, the parts of which are adherent, is placed in the mold and subjected to a shaping operation; or, fourth, and preferably, one of such elements, H, J, may be first formed in the shell A, and immediately thereafter the other of such formed upon it and simultaneously united to it.

It will readily be discerned that the plunger D and former E may be made integral, if desired, but if they are made integral, the second auxiliary former F employed for making the backing member H will be separable. If, however, the members D and E are not made integral, the formers E and F may be made integral for carrying out the first and third methods of operation above set forth. In the specification and claims, where I use the term "red fibre" I mean to include thereby a product known under this name which is a gelatinized cellulosic product, such as made by the action of zinc chloride upon cellulose.

Having thus described my invention and illustrated its use, what I claim as new and desire to secure by Letters Patent is—

1. The process of making composite gaskets which comprises forming in a suitable mold while in plastic state a form sustaining rigid body of final shape comprising a phenolic condensation product to afford a gasket backing base member, and then joining and forming therewith by the application of heat a wearing surface element of non-metallic material, relatively softer and more pliable than said rigid body.

2. The process of making composite gaskets which comprises forming in a suitable mold while in plastic state a form sustaining, rigid body of final shape comprising a phenolic condensation resin to form a gasket backing base member and then joining and forming therewith by the application of heat and pressure a wearing surface element of non-metallic material, relatively softer and more pliable than said rigid body.

3. The process of making composite gaskets which comprises forming in a suitable mold while in plastic state a form sustaining rigid body of final shape comprising a phenolic condensation resin to afford a gasket backing base member and then forming in the mold, in contact with said base member, a second member of relatively soften and more pliable material than said rigid body.

4. The process of making composite gaskets and the like which includes emplacing in a mold a backing element made of phenolic condensation resin having an exposed gasket backing surface of final contour, emplacing thereupon in said mold wearing material comprising a rubber asbestos mixture and forming the same with a flexible joint wearing surface, the elements and the wearing material being united in the forming operation of said rubber asbestos material.

In testimony whereof, I have hereunto signed my name.

FRANCIS NORWOOD BARD.